(12) United States Patent
Tanaka

(10) Patent No.: US 7,463,002 B2
(45) Date of Patent: Dec. 9, 2008

(54) ROBOT CONTROLLER SYSTEM

(75) Inventor: Toyoki Tanaka, Okaya (JP)

(73) Assignee: Seiko Epson Corporation (JP)

( * ) Notice: Subject to any disclaimer, the term of this patent is extended or adjusted under 35 U.S.C. 154(b) by 79 days.

(21) Appl. No.: 11/605,492

(22) Filed: Nov. 28, 2006

(65) Prior Publication Data
US 2007/0120513 A1 May 31, 2007

(30) Foreign Application Priority Data
Nov. 29, 2005 (JP) .............................. 2005-344655
Jun. 29, 2006 (JP) .............................. 2006-180153

(51) Int. Cl.
*G05B 11/28* (2006.01)
(52) U.S. Cl. ..................... 318/569; 318/602; 318/625
(58) Field of Classification Search ................ 318/700, 318/569, 600, 602, 625, 49
See application file for complete search history.

(56) References Cited

U.S. PATENT DOCUMENTS

| | | | | |
|---|---|---|---|---|
| 3,739,158 | A * | 6/1973 | Woodward | 318/571 |
| 4,053,819 | A * | 10/1977 | Matsumoto | 318/636 |
| 5,025,200 | A * | 6/1991 | Kurakake et al. | 318/569 |
| 5,184,053 | A * | 2/1993 | Maruo et al. | 318/571 |
| 5,493,194 | A | 2/1996 | Damiano et al. | |
| 5,659,480 | A * | 8/1997 | Anderson et al. | 700/186 |
| 5,742,143 | A * | 4/1998 | Katagiri | 318/625 |
| 6,046,566 | A * | 4/2000 | Sonoda et al. | 318/625 |
| 6,150,786 | A * | 11/2000 | Kinoshita et al. | 318/564 |
| 6,188,190 | B1 * | 2/2001 | Arakawa | 318/560 |
| 6,297,612 | B1 | 10/2001 | Shloush et al. | |
| 2004/0002778 | A1 | 1/2004 | Giamona et al. | |

FOREIGN PATENT DOCUMENTS

| | | |
|---|---|---|
| EP | 0 422 244 A1 | 4/1990 |
| JP | 02-278306 | 11/1990 |
| JP | 10-020910 | 1/1998 |
| JP | 10-020922 | 1/1998 |
| JP | 2000-112512 | 4/2000 |

* cited by examiner

*Primary Examiner*—Rina I Duda
(74) *Attorney, Agent, or Firm*—Harness, Dickey & Pierce, P.L.C.

(57) ABSTRACT

A robot controller system includes a robot including a first actuator and a second actuator, a main controller for driving the first actuator, and a sub-controller for driving the second actuator. In the main controller, an actuator controller generates first control data for the first actuator and second control data for the second actuator, a first actuator driver generates a first drive signal based on the first control data, and a first input/output unit provides the sub-controller with the second control data. In the sub-controller, a second actuator driver generates a second drive signal based on the second control data provided via a second input/output unit from the first input/output unit. The main controller receives the second drive signal via the second input/output unit and the first input/output unit from the second actuator driver and provides the second actuator with the second drive signal.

5 Claims, 9 Drawing Sheets

ROBOT CONTROLLER SYSTEM

CROSS-REFERENCE TO RELATED APPLICATIONS

This application is based upon and claims the benefit of priority from prior Japanese Patent Applications No. 2005-344655 filed on Nov. 29, 2005 and No. 2006-180153 filed on Jun. 29, 2006, the entire contents of which are incorporated herein by reference.

BACKGROUND

1. Technical Field

The present invention relates to a system for controlling a robot

2. Related Art

An industrial robot is typically connected to a robot controller by a power cable and a signal cable. The power cable is used for supplying power from the robot controller to the industrial robot motor. The signal cable is used for transmitting information relating to motor speed from the industrial robot to the robot controller. The robot controller sends operation instructions to actuators of the industrial robot through these connection cables to make the industrial robot perform a desired operation.

When such a robot controller is used to control, for example, a four-axis control industrial robot, the robot controller has four servo amplifiers. When used for controlling a six-axis control industrial robot, the robot controller has six servo amplifiers. Thus, a special type of robot controller is selected for each type of industrial robot. Therefore, a special type of robot controller must be prepared for each type of industrial robot. This increases production costs.

Accordingly, the formation of a robot controller system including a plurality of robot controllers has been proposed to flexibly cope with expansions or changes in the functions of the robots.

JP-A-10-20910 describes a main controller connected to a plurality of sub-controllers. The main controller stores definition files respectively defining plural types of robots. The main controller selects the definition file of the robot type that is to be controlled and sequentially computes movements and joint angles of the robot. The sub-controllers compute the drive amounts of actuators based on the movements and joint angles computed by the main controller to drive-control the actuators. When the function of a robot is expanded or changed, the robot controller is able to cope with the expansion or change just by changing the definition file. This eliminates the need of providing additional robot controllers and enables the use of existing robot controllers.

JP-A-10-20922 describes that the main controller stores drive programs for sub-controllers. The main controller has the sub-controllers download the associated drive programs at a predetermined timing. Thus, the robot controller is able to flexibly cope with changes or updates in the drive programs.

JP-A-2000-112512 describes a plurality of robot controllers, each including a transceiver and a memory. Each of the robot controllers exchanges I/O information with other robot controllers and stores common I/O information in its memory. This exchange of information makes it possible, for example, to control a six-axis control industrial robot through cooperation between a robot controller having four motor drivers and a robot controller having two motor drivers. Accordingly, this enables the use of common robot controllers.

However, with the above robot controller system, the sub-controllers sequentially compute control commands for the associated actuators. Therefore, each sub-controller has a CPU for computing control commands and a memory serving as a working area for the CPU. As a result, the size and cost of the sub-controllers are increased. This leads to problems such as increase in installation space and cost of the robot controller system.

Moreover, in the conventional robot controller system described above, the main controller is required to synchronize the CPUs of the sub-controllers. This complicates the configuration of the main controller and increases the cost of the robot controller system.

SUMMARY

The present invention provides an inexpensive robot controller system that does not require a large installation space.

One aspect of the invention is a robot controller system. The robot controller system includes a robot including a first actuator and a second actuator, a main controller for driving the first actuator, and a sub-controller for driving the second actuator. The main controller includes an actuator controller for computing a target drive amount for the first actuator to generate first control data including the target drive amount for the first actuator and for computing a target drive amount for the second actuator to generate second control data including the target drive amount for the second actuator, a first actuator driver for generating a first drive signal based on the first control data and providing the first actuator with the first drive signal to drive the first actuator, and a first input/output unit providing the sub-controller with the second control data. The sub-controller includes a second actuator driver for generating a second drive signal based on the second control data and providing the second actuator with the second drive signal to drive the second actuator, and a second input/output unit for providing the second actuator driver with the second control data from the first input/output unit.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF EXEMPLARY EMBODIMENTS

Figure 1:
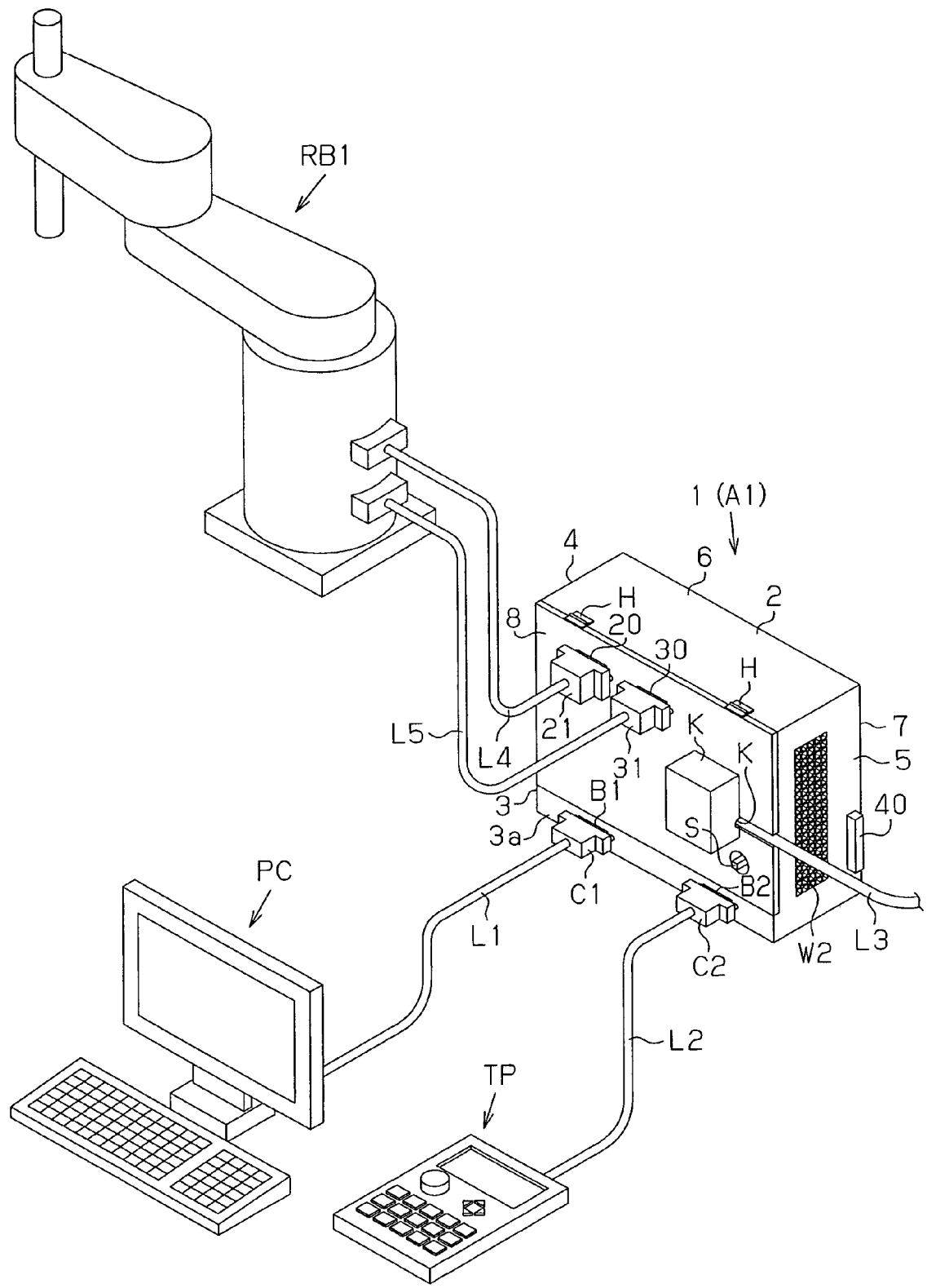
FIG. 1 is a perspective view showing a robot controller system according to a preferred embodiment of the invention.

In the drawings, like numerals are used for like elements throughout.

Figure 2:
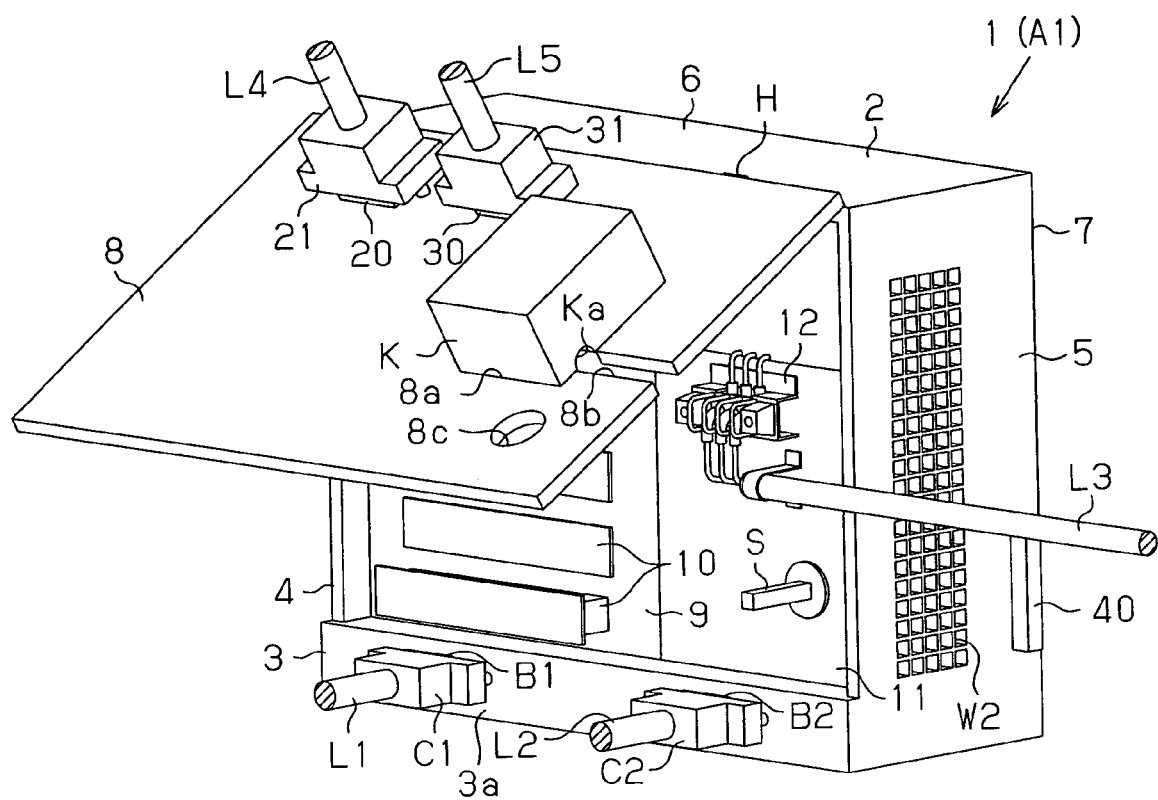
FIG. 2 is a perspective view showing a controller body in the preferred embodiment.
Figure 3:
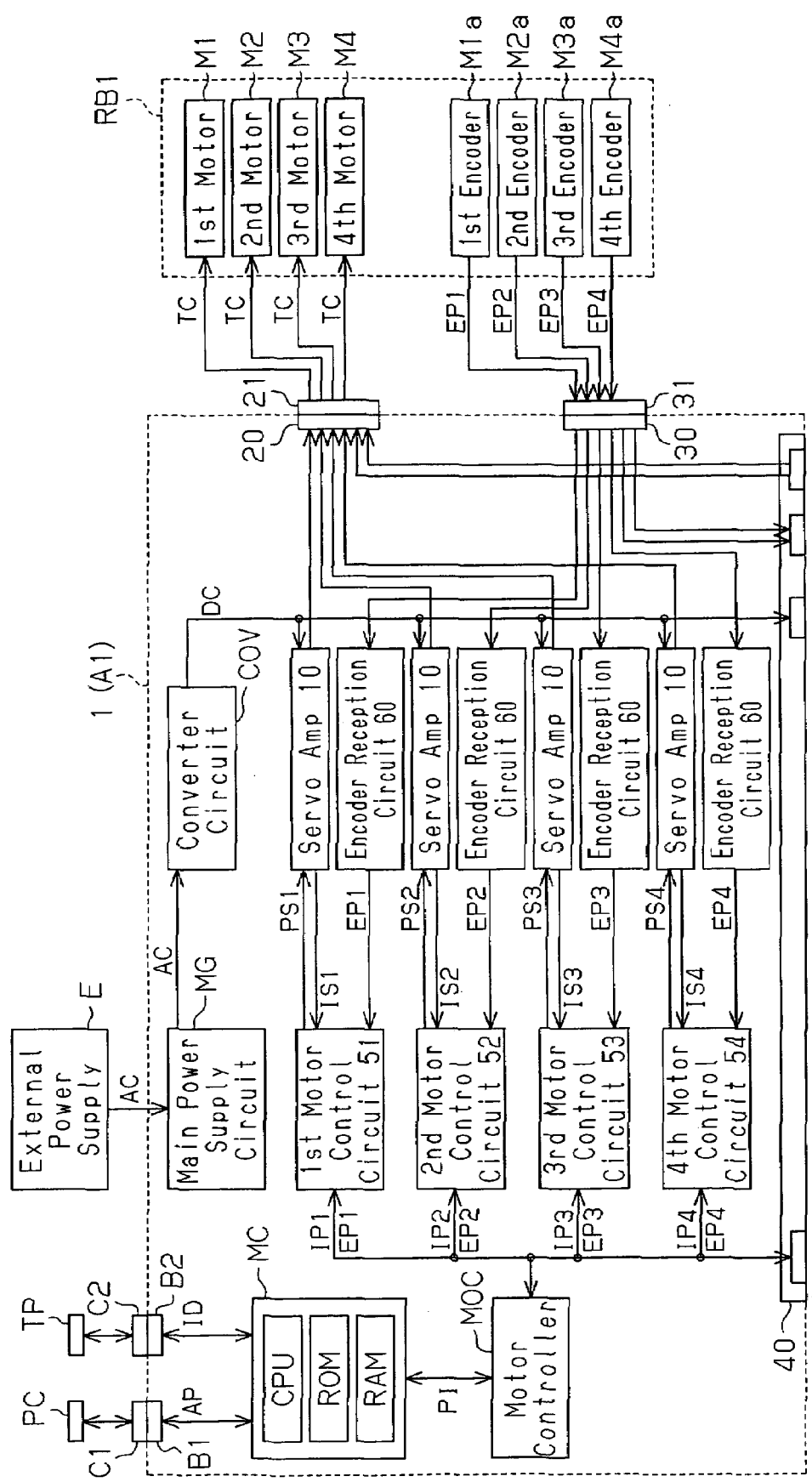
FIG. 3 is a block diagram showing the electrical configuration of the controller body in the preferred embodiment.

A preferred embodiment of the invention will now be described with reference to FIGS. 1 to 6. As shown in FIGS. 1 to 3, a robot controller system 1 according to the preferred embodiment of the invention includes a controller body A1 serving as a main controller. FIG. 1 is a perspective view showing the robot controller system 1, and FIG. 2 is a perspective view showing the controller body A1.

FIG. 1 shows a robot RB1, which is a four-axis control, horizontal articulated type industrial robot having first-to fourth motors M1 to M4 serving as a first actuator (see FIG. 3). The robot RB1 is drive-controlled by the robot controller system 1 (controller body A1).

The controller body A1 includes a generally box-shaped body housing 2 having a panel which is movable between a first position, in which the panel opens the body housing 2, and a second position, in which the panel closes the body housing 2. The body housing 2 includes a base 3, a left plate 4, a right plate 5, a top plate 6, a rear plate 7, and a front panel 8.

The base 3 includes base-side interface connectors B1 and B2. The base-side interface connectors B1 and B2 are attached such that their long sides extend horizontally. The base-side interface connectors B1 and B2 are connected to connectors of connection cables L1 and L2 (cable-side interface connectors C1 and C2), respectively. The connection cables L1 and L2 are connected to a personal computer PC and a teaching pendant TP, respectively.

The left plate 4 and the right plate 5 each have a vent hole W2. A cooling fan (not shown) is arranged on the inner surface of the left plate 4. The cooling fan draws external air into the body housing 2 through the vent hole W2 in the left plate 4 and forcibly discharges the air from the vent hole W2 in the right plate 5. The controller body A1 thus cools the interior of the body housing 2 by operating the cooling fan.

As shown in FIG. 2, a rack 9 is arranged in the body housing 2. The rack 9 includes four servo amplifiers 10 for respectively driving the motors M1 to M4. The servo amplifiers 10 are detachably arranged at predetermined intervals in the vertical direction. The body housing 2 includes a terminal fixing plate 11 arranged at the right side of the rack 9 in the body housing 2. The terminal fixing plate 11 includes a power input terminal 12. The power input terminal 12 is connected to a power cable L3 and supplied with power from an external power supply.

The upper side of the front panel 8 is connected to the top plate 6 by a hinge H. The front panel 8 pivots about the hinge H to open and close the opening of the body housing 2.

The front panel 8 includes a panel-side power connector 20. The panel-side power connector 20 is attached to the upper section of the front panel 8 so that its long sides extend horizontally. The panel-side power connector 20 is connected to a connector (cable-side power connector 21) of a power connection cable L4, which is further connected to the robot RB1. The panel-side power connector 20 is connected to the servo amplifiers 10 by internal power lines (not shown) arranged on the rear side of the front panel 8. The internal power lines are sized so that they do not hinder the movement of the front panel 8 between the first and second positions at which the front panel 8 respectively opens and closes the body housing 2.

A panel-side signal connector 30 is attached on the right side of the panel-side power connector 20. The panel-side signal connector 30 is attached to the front panel 8 such that its long sides extend horizontally. The panel-side signal connector 30 is connected to a connector (cable-side signal connector 31) of a signal connection cable L5, which is further connected to the robot RB1. The panel-side signal connector 30 is connected to the servo amplifiers 10 by internal power lines (not shown) arranged on the rear side of the front panel 8. The internal power lines are sized so that they do not hinder the movement of the front panel 8 between the first and second positions at which the front panel 8 respectively opens and closes the body housing 2.

The front panel 8 includes a terminal hole 8a and a cable groove 8b, which are formed in the right side of the front panel 8 at positions facing the power input terminal 12. The power input terminal 12 extends through the terminal hole 8a when the front panel 8 is arranged at the closed second position. The power cable L3 is received in the cable groove 8b when the front panel 8 is arranged at the closed second position. The front panel 8 includes a generally cup-shaped cover case K provided on the front surface of the front panel 8 to cover the terminal hole 8a from the outer side. The cover case K includes a recess Ka formed in the right side. The cover case K protects the power input terminal 12 and the power cable L3, which is received in the recess Ka when the front panel 8 is in the closed second position. The recess Ka enables the power cable L3 to extend out of the body housing 2 regardless of the position of the front panel 8.

The right side of the front panel 8 includes an insertion hole 8c below the terminal hole 8a. A power switch S formed on the terminal fixing plate 11 extends though the insertion hole 8c. The power switch S is used for activating and inactivating the controller body A1.

The right plate 5 of the body housing 2 includes a connector (body-side connector 40) extending out of the body housing 2. In this embodiment, the body-side connector 40 forms a first input/output unit.

The electrical configuration of the controller body A1 will now be described with reference to FIG. 3.

As shown in FIG. 3, the controller body A1 includes a main power supply circuit MG which is connected to an external power supply E to form a power supply device. The main power supply circuit MG supplies a converter circuit COV with alternating current ("AC") power supplied from the external power supply E. The converter circuit COV rectifies the AC power to generate direct current ("DC") power as an output signal and supplies the DC power to circuits of the controller body A1 (for example, the servo amplifiers 10) and the body-side connector 40.

The controller body A1 has a master controller MC. The master controller MC includes a CPU, a ROM storing various data and control programs, and a RAM such as a DRAM or SRAM for storing various data. The CPU, the ROM, and the RAM are connected to one another by a bus (not shown).

The master controller MC is connected to the base-side interface connector B1. The master controller MC is connected to the personal computer PC by the base-side interface connector B1 and the cable-side interface connector C1. The personal computer PC transmits to the master controller MC application program data (program data AP) used for driving the robot RB1. The personal computer PC displays the data computed by and stored in the master controller MC.

The master controller MC is also connected to the base-side interface connector B2. The master controller MC is connected to the teaching pendant TP by the base-side interface connector B2 and the cable-side interface connector C2. The teaching pendant TP transmits to the master controller MC teaching data ID for teaching the robot RB1. The teaching pendant TP displays teaching-related data computed by the master controller MC and teaching-related data stored in the master controller MC. The master controller MC stores point data indicating taught operation positions of the hands of the robot RB1 based on the teaching data ID.

The master controller MC computes the angle of each joint of the robot RB1 based on the program data AP and the point data to generate data relating to target speeds of the motors M1 to M4 (position instruction data PI).

The master controller MC is connected to a motor controller MOC serving as an actuator controller. The motor controller MOC is connected to a plurality of motor control circuits (first to fourth motor control circuits 51 to 54) and the body-side connector 40. The motor control circuits 51 to 54 are respectively connected to the servo amplifiers 10 and encoder reception circuits 60. The servo amplifiers 10 are connected to the corresponding motors (the first to fourth motor M1 to M4) by the panel-side power connector 20 and the cable-side power connector 21. The encoder reception circuits 60 are connected to the corresponding encoders of the corresponding motors (first to fourth encoders M1a to M4a) by the panel-side signal connector 30 and the cable-side signal connector 31.

In this embodiment, each of the motor control circuits (first to fourth motor control circuits 51 to 54), the corresponding servo amplifier 10, and the corresponding encoder reception circuit 60 form a single first actuator. Thus, the controller body A1 has four first actuator drivers.

The motor controller MOC receives position instruction data PI from the master controller MC. The motor controller MOC also receives signals relating to the present positions of the motors (position information signals, or first to fourth encoder pulse signals EP1 to EP4) from the corresponding encoder reception circuits 60. The motor controller MOC computes target load currents (target drive amounts) for equalizing the speeds of the motor M1 to M4 with the target speeds based on the position instruction data PI and the encoder pulse signals EP1 to EP4. The motor controller MOC generates first control data including the target load currents (first to fourth current instruction data IP1 to IP4) and provides the current instruction data IP1 to IP4 to the respective motor control circuits (first to fourth motor control circuits 51 to 54).

The motor control circuits 51 to 54 each receive a signal relating to the actual load current of the corresponding motor (current detection signals, or first to fourth current detection signals IS1 to IS4) from the associated servo amplifier 10. The motor control circuit 51 compares the current detection signal IS1 with the current instruction data IP1 to generate a power element drive signal (first power element drive signal PS1) for driving the power element of the corresponding servo amplifier 10 to equalize the actual load current with the target load current. In the same manner as the motor control circuit 51, each of the motor control circuits 52 to 54 compares the current detection signal (IS2 to IS4) with the current instruction data (IP2 to IP4) to generate a power element drive signal (second to fourth power element drive signals PS2 to PS4) for driving the power element of the corresponding servo amplifier 10 to equalize the actual load current with the target load current. The motor control circuits 51 to 54 supply the power element drive signals PS1 to PS4 to the respective servo amplifiers 10.

The servo amplifiers 10 receive DC power from the converter circuit COV. The servo amplifiers 10 each use the DC power from the converter circuit COV to generate load current (first drive signal, or variable-frequency three-phase current TC) based on the corresponding power element drive signals PS1 to PS4. The servo amplifiers 10 supply the three-phase current TC to the corresponding motors.

Each of the servo amplifiers 10 has a current detection circuit (not shown) to detect actual load current supplied to the corresponding motor (first to fourth motors M1 to M4). The servo amplifiers 10 supply the detected actual load current to the respective motor control circuits (first to fourth motor control circuits 51 to 54) as feedback values (first to fourth current detection signals IS1 to IS4).

Each of the first to fourth encoders M1a to M4a detects the present position of the corresponding motor (first motor M1 to fourth motor M1). The encoders M1a to M4a generate and provide position information signals relating to the detected present positions (first to fourth encoder pulse signals EP1 to EP4) to the corresponding encoder reception circuits 60.

The encoder reception circuits 60 provide position information signals (first to fourth encoder pulse signals EP1 to EP4) received from the corresponding encoders M1a to M4a to the associated motor control circuits (first to fourth motor control circuits 51 to 54). The first to fourth motor control circuits 51 to 54 provide the position information signals (first to fourth encoder pulse signals EP1 to EP4) received from the corresponding encoder reception circuits 60 to the motor controller MOC.

Specifically, the motor controller MOC computes a target load current for each of the motors M1 to M4 based on the position instruction data PI from the master controller MC and the encoder pulse signals EP1 to EP4 from the motor control circuits. The motor controller MOC generates the first to fourth current instruction data IP1 to IP4 including the target load currents and provides the data IP1 to IP4 to the first to fourth motor control circuits 51 to 54, respectively. The first to fourth motor control circuits 51 to 54 respectively generate power element drive signals PS1 to PS4 based on the current instruction data IP1 to IP4 from the motor controller MOC and the current detection signals IS1 to IS4 from the corresponding servo amplifiers 10. The first to fourth motor control circuits 51 to 54 provide the power element drive signals PS1 to PS4 to the servo amplifiers 10 to drive the motors M1 to M4, respectively.

The master controller MC having the above configuration performs PWM (Pulse Width Modulation) control on the first to fourth motors M1 to M4 so as to minimize the error between the present position and the position of the position instruction data PI for each of the first to fourth motors M1 to M4.

Figure 4:
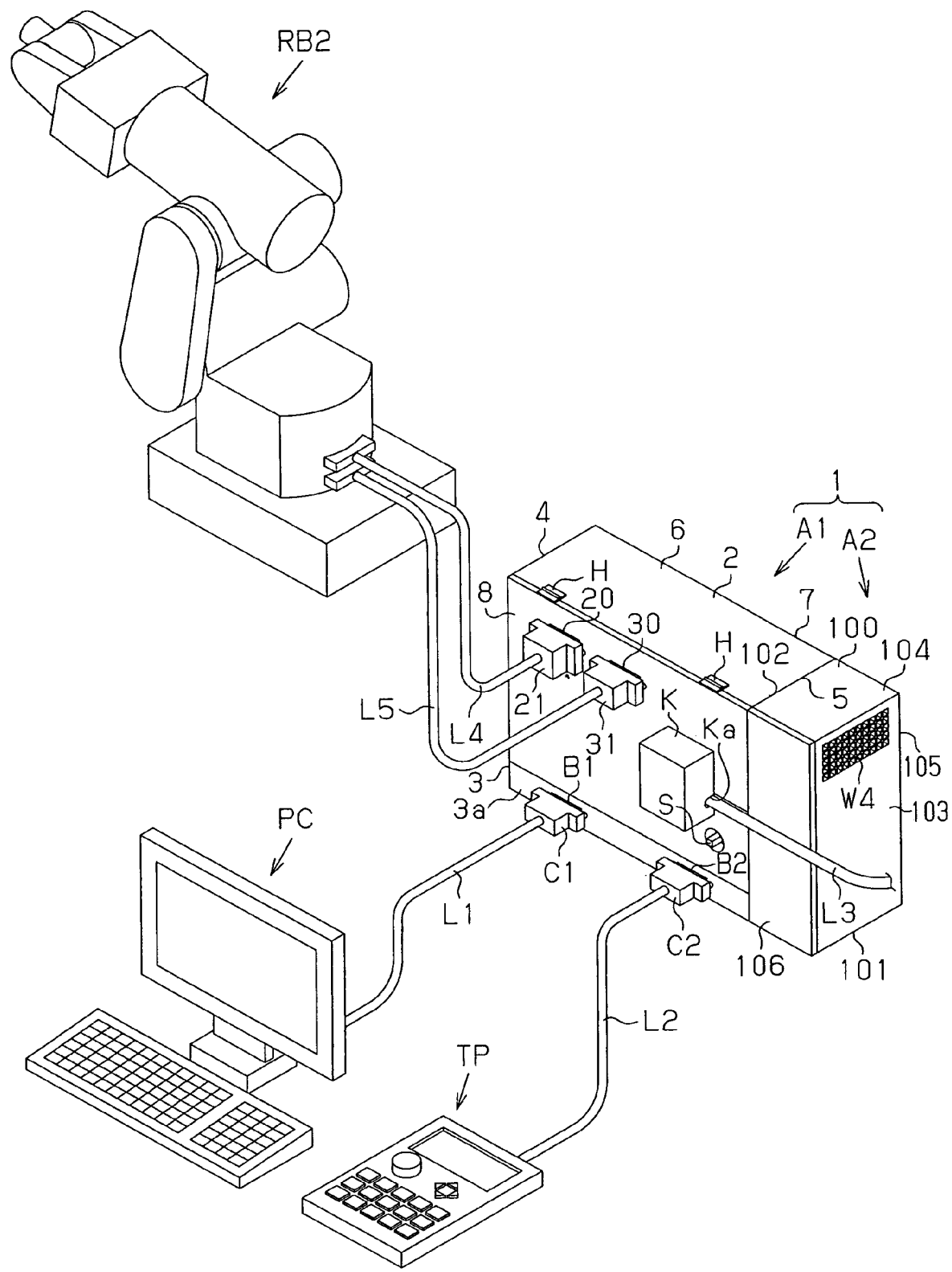
FIG. 4 is a perspective view showing the robot controller system in the preferred embodiment.
Figure 5:
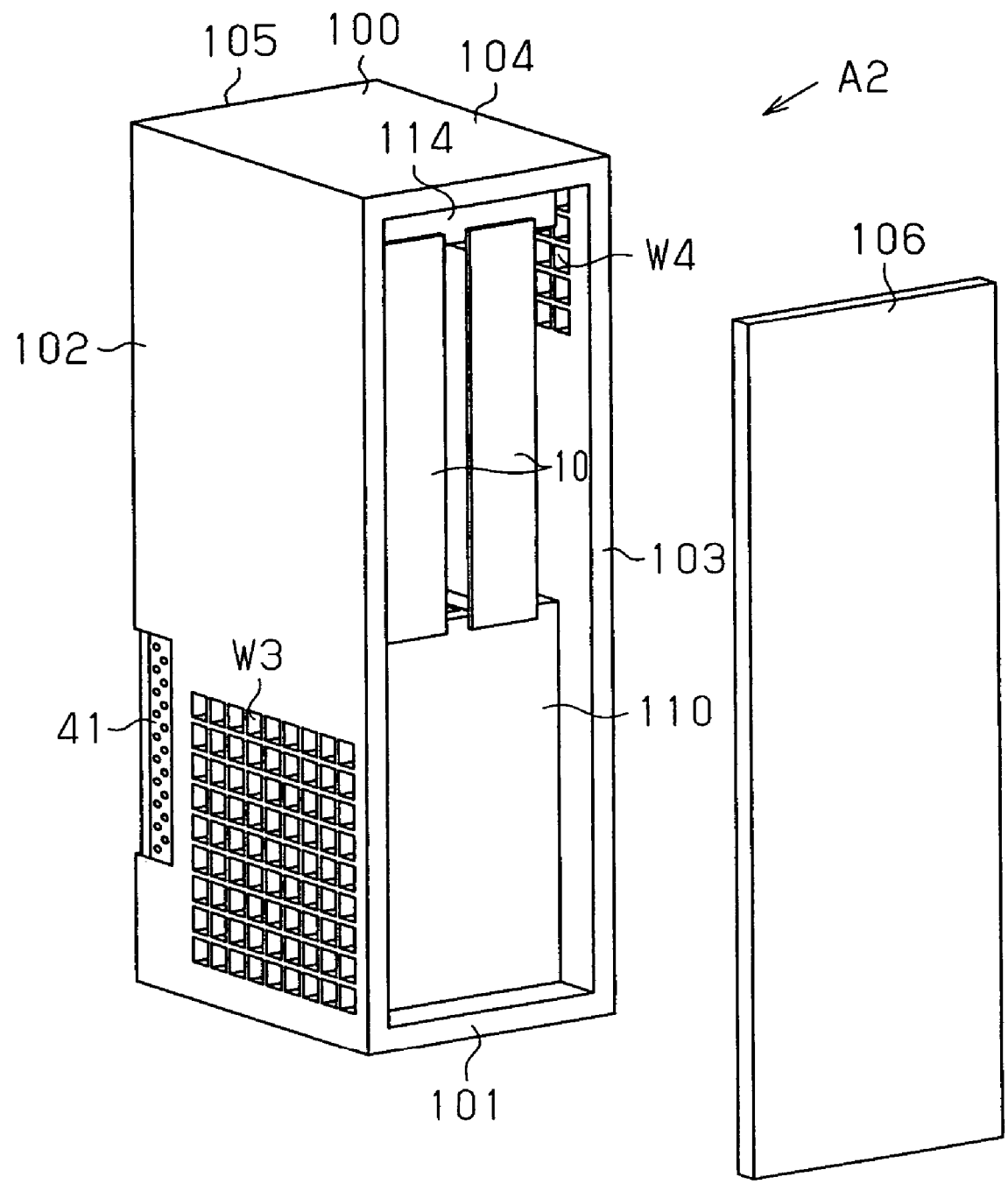
FIG. 5 is an exploded perspective view showing an additional controller in the preferred embodiment.
Figure 6:
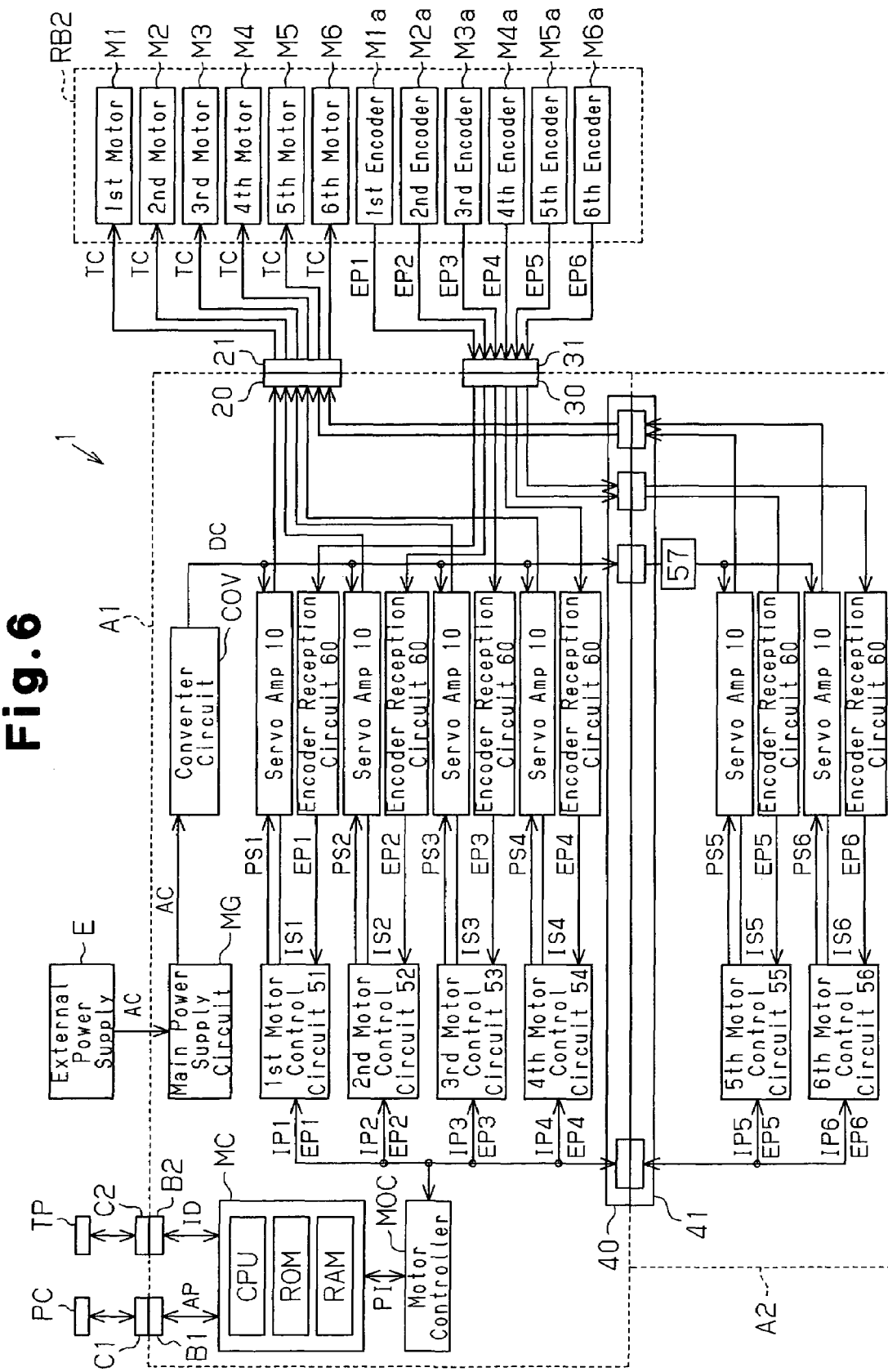
FIG. 6 is a block diagram showing the electrical configuration of the robot controller in the preferred embodiment.

As shown in FIGS. 4 to 6, the robot controller system 1 of the present embodiment of the invention may include an additional controller A2 serving as a sub-controller, in addition to the controller body A1 serving as the main controller. To avoid redundancy, the controller body A1 will not be described. FIG. 4 is a perspective view showing the robot controller system 1 including an additional controller A2, and FIG. 5 is an exploded perspective view showing the additional controller A2.

In FIG. 4, a robot RB2 is a six-axis control, vertical articulated type industrial robot having first to fourth motors M1 to M4 serving as a first actuator and fifth and sixth motors M5 and M6 (see FIG. 6) serving as a second actuator. The robot RB2 is drive-controlled by the robot controller system 1. The robot controller system 1 includes the controller body A1 and the additional controller A2.

The controller body A1 is connected to the robot RB2 by the panel-side power connector 20, the panel-side signal connector 30, the cable-side power connector 21, the cable-side signal connector 31, and the connection cables L4 and L5. The controller body A1 is also connected to the personal computer PC and the teaching pendant TP by the base-side interface connectors B1 and B2, the cable-side interface connectors C1 and C2, and the connection cables L1 and L2. The personal computer PC transmits an application program for the robot RB2 (program data AP) to the controller body A1. The teaching pendant TP transmits teaching data ID for teaching the robot RB2 to the controller body A1.

The additional controller A2 is joined to the body housing 2 of the controller body A1 such that the additional controller A2 is in close contact with the right plate 5. The additional controller A2 has an additional box-shaped housing 100.

As shown in FIG. 5, the additional housing 100 has a bottom plate 101, a top plate 104, a left plate 102, a right plate 103, a rear plate 105, and a front plate 106. The bottom plate 101 and the top plate 104 are provided with a lower support 110 and an upper support 114, respectively. Two servo amplifiers 10 are detachably attached between the lower support 110 and the upper support 114. The servo amplifiers 10 are connected to an additional circuit board (not shown) in the additional housing 100 when the servo amplifiers 10 are arranged in and fixed to the additional housing 100.

The rear lower section of the left plate 102 includes an additional connector 41, serves as a second input/output unit. The additional connector 41 is connected to the two servo amplifiers 10 by the additional circuit board. The additional connector 41 is electrically connected to the body-side connector 40 of the controller body A1 when the additional controller A2 is joined to the controller body A1. The two servo amplifiers 10 of the additional controller A2 are electrically connected to the motor controller MOC of the controller body A1 when the additional connector 41 is connected to the body-side connector 40.

The front lower section of the left plate 102 includes a vent hole W3. The vent hole W3 is arranged so as to face the vent hole W2 in the right plate 5 of the controller body A1 when the additional controller A2 is joined to the controller body A1. The vent hole W3 draws the air discharged from the body housing 2 into the additional housing 100. The front upper section of right plate 103 includes a vent hole W4. The vent hole W4 discharges the air drawn into the additional housing 100 to cool the interior of the additional housing 100.

The electrical configuration of the robot controller system 1 including the additional controller A2 will now be described with reference to FIG. 6. To avoid redundancy, the controller body A1 will not be described.

The master controller MC of the controller body A1 computes an angle of each joint of the robot RB2 based on the program data AP and the point data to generate data relating to target speeds for first to sixth motors M1 to M6 (position instruction data PI). The master controller MC provides the position instruction data PI to the motor controller MOC.

The panel-side power connector 20 and the panel-side signal connector 30 of the controller body A1 have relay terminals connected to the fifth and sixth motors M5 and M6 and fifth and sixth encoders M5a and M6a, respectively. The relay terminals of the panel-side power connector 20 and the panel-side signal connector 30 are connected to the body-side connector 40.

The additional controller A2 has a fifth motor control circuit 55 and a sixth motor control circuit 56. The fifth motor control circuit 55 and the sixth motor control circuit 56 are connected to the motor controller MOC when the additional connector 41 is connected to the body-side connector 40.

The fifth motor control circuit 55 and the sixth motor control circuit 56 are connected to the respective corresponding servo amplifier 10 and encoder reception circuit 60. The servo amplifiers 10 of the additional controller A2 are connected to the respective motors (the fifth motor M5 and the sixth motor M6) via the panel-side power connector 20 and the cable-side power connector 21 when the additional connector 41 is connected to the body-side connector 40. The servo amplifiers 10 of the additional controller A2 are connected to a capacitor 57. The capacitor 57 compensates for the capacitance of a converter circuit COV when the additional connector 41 is connected to the body-side connector 40.

The encoder reception circuits 60 of the additional controller A2 are connected to the encoders (fifth and sixth encoders M5a and M6a) of the corresponding motors by the panel-side signal connector 30 and the cable-side signal connector 31 when the additional connector 41 is connected to the body-side connector 40.

In the present embodiment, each of the motor control circuits (the fifth or sixth motor drive circuit 55 or 56), the corresponding servo amplifier 10, and the corresponding encoder reception circuit 60 forms a single second actuator driver. Thus, the additional controller A2 includes two second actuator drivers.

The motor controller MOC of the controller body A1 receives signals relating to present positions of the fifth and sixth motors M5 and M6 (position information signals, or fifth and sixth encoder pulse signals EPS and EP6) from the corresponding encoder reception circuits 60. The motor controller MOC computes target load currents (target drive amounts) for the fifth and sixth motors M5 and M6 to equalize the speeds of the fifth and sixth motors M5 and M6 with the target speeds based on the position instruction data PI and the fifth and sixth encoder pulse signals EP5 and EP6. The motor controller MOC generates second control data (fifth and sixth current instruction data IP5 and IP6) including the target load currents and provides the current instruction data IP5 and P6 to the motor control circuits (fifth and sixth motor control circuits 55 and 56), respectively.

The fifth and sixth motor control circuits 55 and 56 receive signals relating to actual load currents of the corresponding motors (current detection signals, or fifth and sixth current detection signals IS5 and IS6) from the associated servo amplifiers 10. The fifth and sixth motor control circuits 55 and 56 compare the current detection signals with the current instruction data (fifth and sixth current instruction data IP5 and IP6). The fifth and sixth motor control circuits 55 and 56 generate power element drive signals (fifth and sixth power element drive signals PS5 and PS6), which drive the power elements of the respective servo amplifiers 10 to equalize the actual load current equal with the target load current, and provides the power element drive signals PS5 and PS6 to the corresponding servo amplifiers 10.

The servo amplifiers 10 of the additional controller A2 receive DC power via the capacitor 57. The servo amplifiers 10 use the DC power received via the capacitor 57 to generate load currents (second drive signals, or variable-frequency three-phase currents TC), based on the fifth and sixth power element drive signals PS5 and PS6. The servo amplifiers 10 supply the three-phase currents TC to the corresponding motors (fifth and sixth motors M5 and M6).

The servo amplifiers 10 of the additional controller A2 each have a current detection circuit (not shown) to detect the actual load current supplied to the corresponding motor (fifth and sixth motors M5 and M6). The servo amplifiers 10 supply the detected actual load current to the corresponding motor control circuits (fifth and sixth motor control circuits 55 and 56) as feedback values (fifth and sixth current detection signals IS5 and IS6).

The fifth and sixth encoders M5a and M6a detect the present positions of the corresponding motors (fifth and sixth motors M5 and M6). The encoders M5a and M6a generate position information signals relating to the detected present positions (fifth and sixth encoder pulse signals EP and EP6) and provide the position information signals to the corresponding encoder reception circuits 60.

The encoder reception circuits 60 of the additional controller A2 respectively receive the position information signals (fifth and sixth encoder pulse signals EP5 and EP6) from the encoders M5a and M6a and provide the position information signals to the corresponding motor control circuits (fifth and sixth motor control circuits 55 and 56). The fifth and sixth motor control circuits 55 and 56 provide the position information signals (the fifth and sixth encoder pulse signals EP5 and EP6) received from the corresponding encoder reception circuits 60 to the motor controller MOC.

Specifically, the motor controller MOC of the controller body A1 computes target load currents for the motors M1 to M6 based on the position instruction data PI from the master controller MC and the encoder pulse signals EP1 to EP6 from the motor control circuits 51 to 56. The motor controller MOC generates current instruction data IP1 to IP6 including the target load currents and provides the current instruction data IP1 to IP6 to the corresponding first to sixth motor control circuits 51 to 56. The motor control circuits 51 to 56 generate power element drive signals PS1 to PS6 based on the current instruction data IP1 to IP6 from the motor controller MOC and the current detection signals IS1 to IS6 from the corresponding servo amplifiers 10. The motor control circuits 51 to 56 supply the power element drive signals PS1 to PS6 to the respective corresponding servo amplifiers 10 to drive the motors M1 to M6.

The above configuration enables the master controller MC to perform PWM (Pulse Width Modulation) control on the first to sixth motors M1 to M6 to minimize the error between the present position of the motors M1 to M6 and the position of the position instruction data PI.

Accordingly, the additional controller A2 is able to have the master controller MC of the controller body A1 generate position instruction data PI for the fifth and sixth motors M5 and M6. The additional controller A2 is also able to cause the motor controller MOC of the controller body A1 to sequentially compute the fifth and sixth current instruction data IP5 and IP6 for drive-controlling the fifth and sixth motors M5 and M6. The additional controller A2 is also able to cause the converter circuit COV of the controller body A1 to generate direct current power supply for generating three-phase current TC.

Thus, the additional controller A2 is able to drive-control the fifth and sixth motors without the need of an arithmetic circuit or memory for generating the position instruction data PI, a motor controller MOC for generating the fifth and sixth current instruction data IP5 and IP6, a main power supply circuit MG, or a converter circuit COV. Accordingly, the size and the cost of the additional controller A2 can be reduced. As a result, the overall size of the robot controller system 1 including the controller body A1 and the additional controller A2 may be reduced, and the installation space may be reduced.

The operation of the robot controller system 1 will now be described. First, the operation of the robot controller system 1 when using only the controller body A1 to control the robot RB1 will be described.

As shown in FIG. 1, the panel-side power connector 20 and the panel-side signal connector 30 are connected to the robot RB1 by the connection cables L4 and L5 of the controller body A1, respectively. The program data AP and the teaching data ID are provided to the master controller MC from the personal computer PC and the teaching pendant TP, respectively. The master controller MC generates position instruction data PI based on the program data AP and the teaching data ID and provides the position instruction data PI to the motor controller MOC.

The motor controller MOC generates current instruction data IP1 to IP4 based on the position instruction data PI and provides the current instruction data IP1 to IP4 to the corresponding motor control circuits 51 to 54. The motor control circuits 51 to 54 respectively generate power element drive signals PS1 to PS4 based on the supplied current instruction data IP1 to IP4 and provides the power element drive signals PS1 to PS4 to the corresponding servo amplifiers 10. Using DC power supplied from the converter circuit COV, the servo amplifiers 10 generate variable-frequency three-phase currents TC based on the supplied power element drive signals PS1 to PS4 by performing the PWM control and supply the three-phase currents TC to the motors M1 to M4 to drive the motors M1 to M4 according to the position instruction data PI.

In the meanwhile, the encoder reception circuits 60 feed back the encoder pulse signals (first to fourth encoder pulse signals EP1 to EP4) from the corresponding encoders to the associated motor control circuits (first to fourth motor control circuits 51 to 54). The servo amplifiers 10 feed back the detected actual load currents to the motor controller MOC after converting the detected actual load currents into current detection signals (first to fourth current detection signals IS1 to IS4).

The motor controller MOC generates current instruction data IP1 to IP4 again based on the position instruction data PI and the encoder pulse signals EP1 to EP4. Then, the motor controller MOC provides the current instruction data IP1 to IP4 to the motor control circuits 51 to 54.

The motor control circuits 51 to 54 generate power element drive signals PS1 to PS4 again based on the current instruction data IP1 to IP4 and the current detection signals IS1 to IS4. Then, the motor control circuits 51 to 54 provide the current instruction data to the corresponding servo amplifiers 10. This operation enables the motors M1 to M4 to be drive-controlled so as to minimize the error between the present position and the position of the position instruction data PI.

The operation of the robot controller system 1 when using the controller body A1 and the additional controller A2 to control the robot RB2, or six-axis control, vertical articulated type industrial robot will now be described.

The additional connector 41 of the additional controller A2 is connected to the body-side connector 40 of the controller body A1. When the connector 40 is connected to the connector 41, the motor controller MOC of the controller body A1 controls the actuator drivers (the motor control circuits 55 and 56, the servo amplifiers 10, and the encoder reception circuits 60) of the additional controller A2.

Specifically, the first to sixth motor control circuits 51 to 56 generate first to sixth power element drive signals PS1 to PS6 based on the first to sixth current instruction data IP1 to IP6 supplied from the motor controller MOC of the controller body A1. The first to sixth motor control circuits 51 to 56 provide the power element drive signals to the corresponding servo amplifiers 10. Using DC power supplied from the converter circuit COV, the servo amplifiers 10 generate variable-frequency three-phase currents TC based on the supplied power element drive signals PS1 to PS6 by performing the PWM control and supply the three-phase currents TC to the corresponding motors M1 to M6 to drive the motors M1 to M6 according to the position instruction data PI.

In the meanwhile, the encoder reception circuits 60 feed back the encoder pulse signals (first to sixth encoder pulse signals EP1 to EP6) from the encoders to the corresponding motor control circuits (first to sixth motor control circuits 51 to 56). The servo amplifiers 10 feed back the detected actual load currents to the motor controller MOC after converting the actual load current into current detection signals (first to sixth current detection signals IS1 to IS6).

The motor controller MOC of the controller body A1 generates first to sixth current instruction data IP1 to IP6 again based on the position instruction data PI and the encoder pulse signals EP1 to EP6. Then, the motor controller MOC provides the first to sixth current instruction data IP1 to IP6 to the motor control circuits 51 to 56.

This operation enables the controller body A1 and the additional controller A2 to control the six-axis control robot RB2.

The robot controller system 1 of the present embodiment has the advantages described below.

(1) In the present embodiment, the controller body A1 includes the master controller MC, which generate the position instruction data PI, and the motor controller MOC, which sequentially computes fifth and sixth current instruction data IP5 and IP6. The controller body A1 and the additional controller A2 have interfaces (the body-side connector 40 and the additional connector 41) for exchanging the position instruction data PI and the fifth and sixth current instruction data IP5 and IP6.

Accordingly, the additional controller A2 drive-controls the fifth and sixth motors without the need of an arithmetic circuit or memory for generating the position instruction data PI. A motor controller MOC for generating the fifth and sixth current instruction data IP5 and IP6 is also not necessary in the additional controller A2. Thus, the size and cost of the additional controller A2 may be reduced. As a result, the overall size of the robot controller system 1 including the controller body A1 and the additional controller A2 is reduced, and the installation space for the robot controller system 1 is reduced.

(2) In addition, the common master controller MC and motor controller MOC control the motor control circuits 51 to 56 of the controller body A1 and the additional controller A2. This significantly simplifies the control system for the motors in comparison with the prior art in which a plurality of CPUs respectively control the motor controllers. Thus, the installation space for the robot controller system may be further reduced.

(3) In the present embodiment, the controller body A1 includes the body-side connector 40, and the additional controller A2 includes the additional connector 41. When the connector 40 is connected to the connector 41, the controller body A1 is connected to the additional controller A2 in close contact. This close contact further reduces the overall size of the robot controller system 1.

(4) Additionally, the converter circuit COV of the controller body A1 is electrically connected to the servo amplifiers 10 of the additional controller A2 just by connecting the connector 40 to the connector 41. Therefore, the additional controller A2 does not require space for the converter circuit COV.

The servo amplifiers 10 of the additional controller A2 are electrically connected to the fifth and sixth motors M5 and M6 just by connecting the connector 40 to the connector 41. Further, the encoder reception circuits 60 of the additional controller A2 are electrically connected to the fifth and sixth encoders M5a and M6a just by connecting the connector 40 to the connector 41.

Thus, the additional controller A2 does not require the panel-side power connector 20 or the panel-side signal connector 30. This reduces the space required for the additional controller A2.

(5) The power connector 20 and 21 and the signal connectors 30 and 31 are collectively arranged at one location. This simplifies the connection cables L4 ad L5 connecting the controller body A1 and the robot RB2.

(6) In the present embodiment, the quantity of the actuator drivers accommodated in the controller body A1 is in accordance with the minimum number of the controlled axes for multiple-axes robots (the robots RB1 and RB2). Therefore, the controller body A1 is commonly used for. controlling the robots RB1 and RB2, which having different number of axes. This enables the use of a common robot controller and lowers the cost of the robot controller.

(7) In the present embodiment, the servo amplifiers 10 of the controller body A1 may be replaced from the front panel 8. The servo amplifiers 10 of the additional controller A2 also can be replaced from the front plate 106. Accordingly, the servo amplifiers 10 can be replaced from the front side of the robot controller system 1 (the front panel 8 and the front plate 106). Therefore, the servo amplifiers 10 can be replaced as required when changing the robot that is subject to control.

It should be apparent to those skilled in the art that the invention may be embodied in many other specific forms without departing from the spirit or scope of the invention. Particularly, it should be understood that the invention may be embodied in the following forms.

Figure 7:
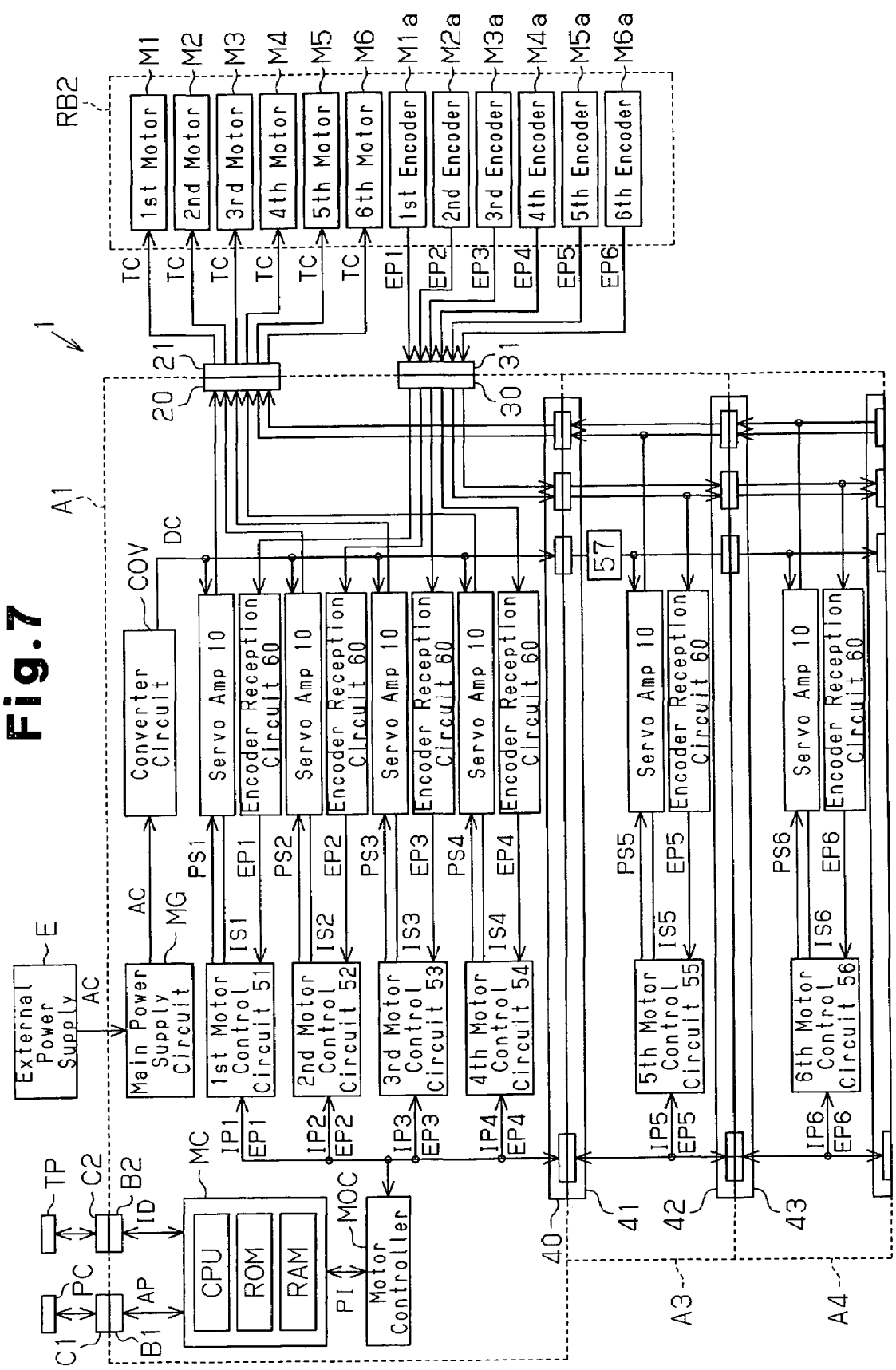
FIG. 7 is a block diagram showing the electrical configuration of a robot controller according to further embodiment of the invention.

In the preferred embodiment of the invention, the single additional controller A2 includes two actuator drivers. However, the invention is not limited in such a manner. For example, as shown in FIG. 7, each one of additional controllers A3 and A4 may include only a single actuator driver. In this case, a fifth motor control circuit 55 of the additional controller A3 may be connected to the controller body A1 by the connectors 40 and 41, and a sixth motor control circuit 56 of the additional controller A4 may be connected to the controller body A1 by the connectors 40, 41, 42, and 43. Alternatively, the controller body A1 may include a plurality of body-side connectors 40, and a plurality of additional controllers may be connected in parallel to the plurality of body-side connectors 40.

Figure 8:
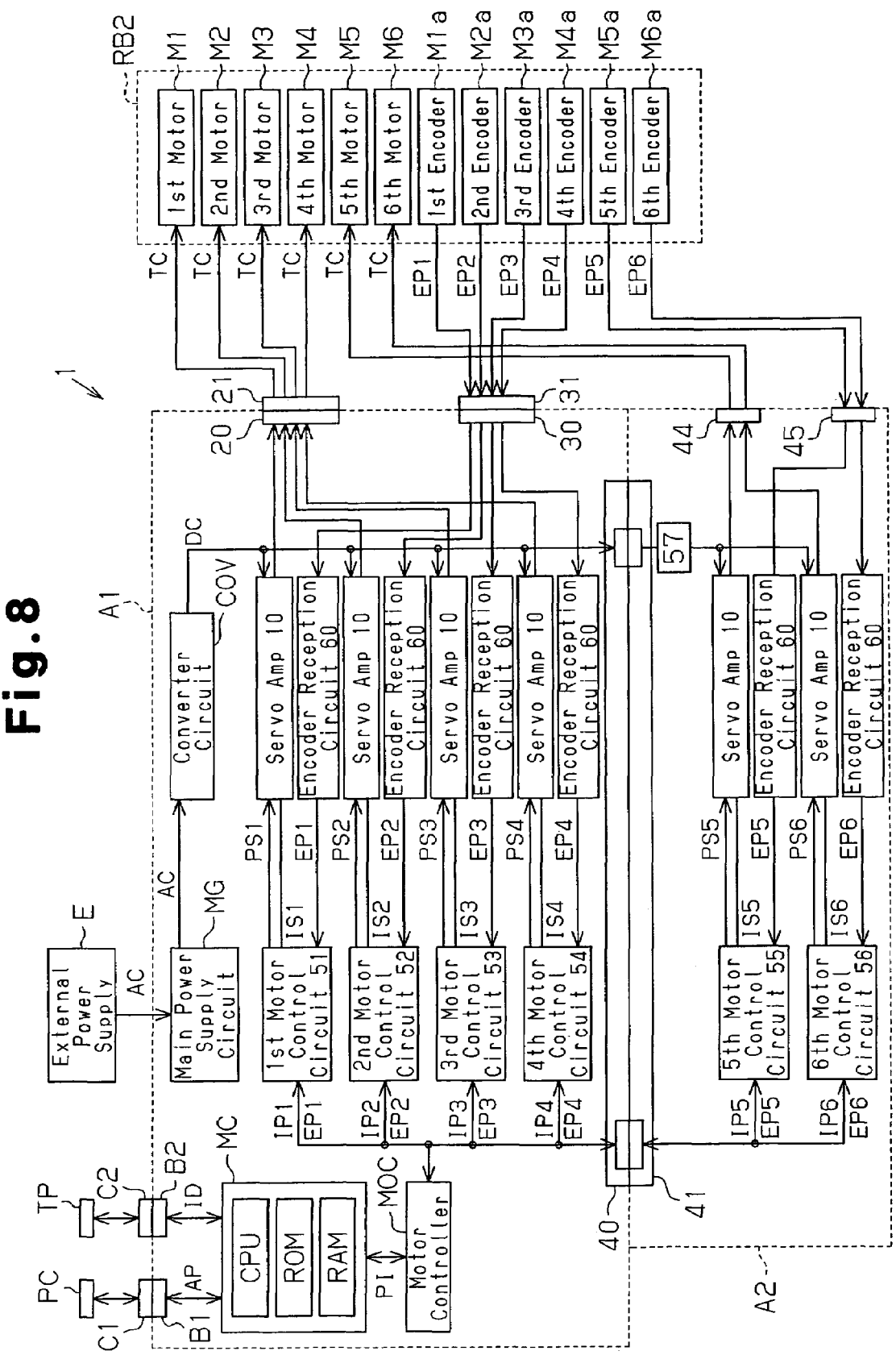
FIG. 8 is a block diagram showing the electrical configuration of a robot controller according to another embodiment of the invention.

In the preferred embodiment of the invention, the servo amplifiers 10 of the additional controller A2 are connected to the robot RB2 by the connectors 40 and 41 and the power connectors 20 and 21. The encoder reception circuits 60 of the additional controller A2 are connected to the robot RB2 by the connectors 40 and 41 and the signal connectors 30 and 31. However, the invention is not limited in such a manner. For example, as shown in FIG. 8, the additional controller A2 may include an additional power connector 44 and an additional signal connector 45, and the servo amplifiers 10 and the encoder reception circuits 60 of the additional controller A2 may be connected to the robot RB2 by the additional power connector 44 and the additional signal connector 45, respectively. In this case, it is preferable that the connection cable connecting the robot RB2 and the robot controller system 1 have two extensions to connect the robot RB2 to both the controller body A1 and the additional controller A2.

Figure 9:
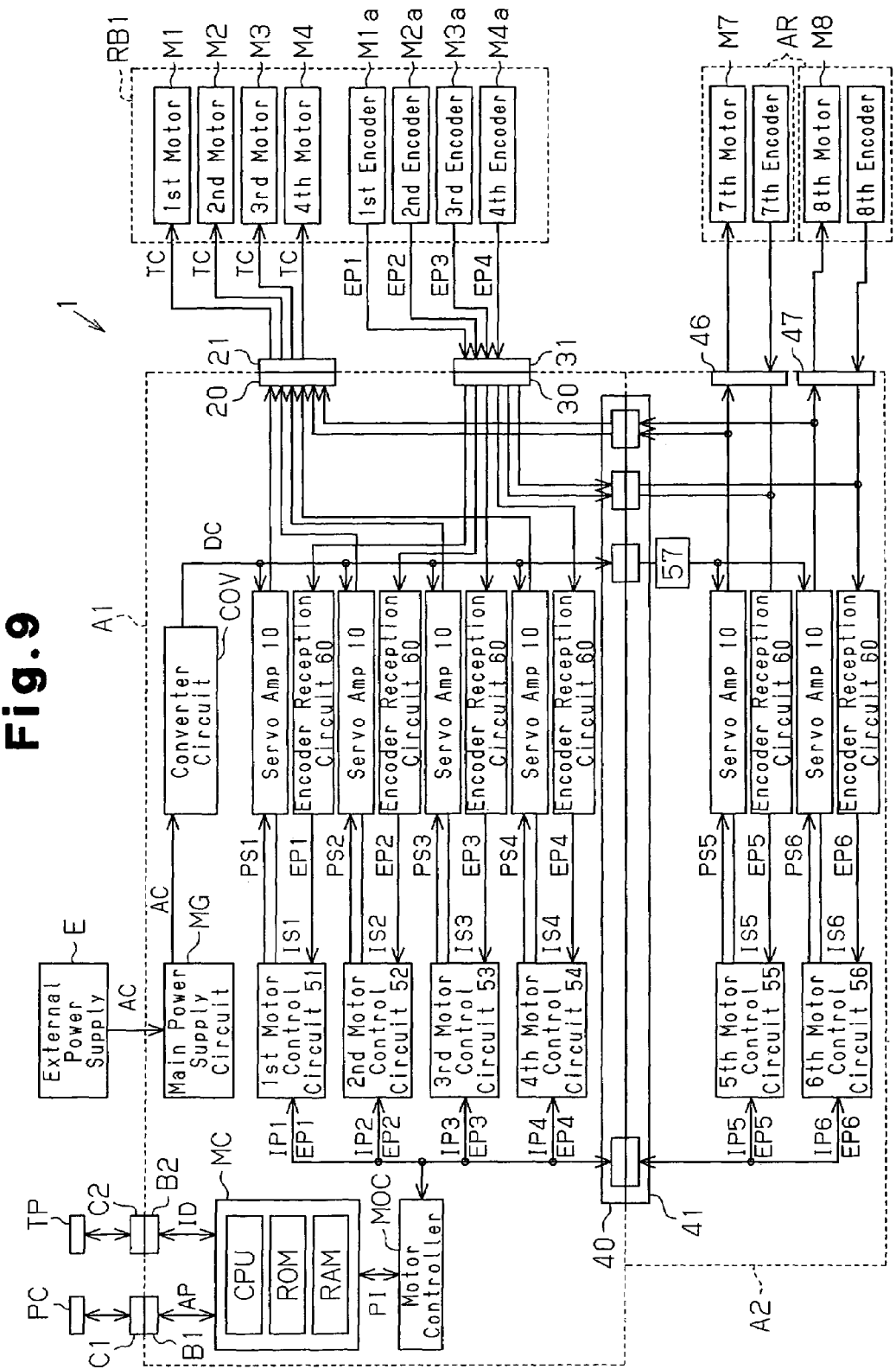
FIG. 9 is a block diagram showing the electrical structure of a robot controller according to a still another embodiment of the invention.

In the preferred embodiment of the invention, the fifth motor control circuit 55 and the sixth motor control circuit 56 of the additional controller A2 drive the fifth motor M5 and the sixth motor M6 of the robot RB2, respectively. However, the invention is not limited in such a manner. As shown in FIG. 9, for example, the fifth motor control circuit 55 and the sixth motor control circuit 56 may respectively control a peripheral device AR driven by a seventh motor M7 and a peripheral device AR driven by an eighth motor M8.

Specifically, the motor controller MOC generates peripheral device control data including the drive amounts for the seventh and eighth motors M7 and M8. The fifth motor control circuit 55, the sixth motor control circuit 56, the servo amplifiers 10, and the encoder reception circuits 60 of the additional controller A2 generate peripheral device drive signals (for example, variable-frequency three-phase currents TC) based on the peripheral device control data. The additional controller A2 may be connected to the peripheral devices AR by the power connector 46 and the signal connector 47 to provide the peripheral device drive signals to the peripheral devices. In this case, the master controller MC and the motor controller MOC may simultaneously drive-control the robot RB1 and the peripheral devices AR.

In the preferred embodiment of the invention, the additional controller A2 is provided with the capacitor 57 for compensating for the capacitance of the converter circuit COV of the controller body A1. However, the invention is not limited in such a manner. For example, the capacitor 57 may be provided in the controller body A1. Further, the capacitor 57 may be omitted as long as the converter circuit COV has sufficient capacitance.

In the preferred embodiment of the invention, the controller body A1 is electrically connected to the additional controller A2 by connecting the body-side connector 40 to the additional connector 41. However, the invention is not limited in such a manner. For example, the controller body A1 may be electrically connected to the additional controller A2 by extending a connection cable from the additional connector 41 and connecting a cable connector attached to the distal end of the connection cable to the body-side connector 40.

In the preferred embodiment of the invention, the robot controller is embodied in the robot controller system 1 that controls the four-axis control robot RB1 or the six-axis control robot RB2. However, the invention is not limited in such a manner. The robot controller system is not restricted by the robot type or the number of axes controlled by the robot. For example, the robot controller system may control a single-axis robot, a double-axis robot, or a triple-axis robot. In this case, it is preferred that the controller body A1 have at least one servo amplifier 10 in correspondence with the robot having the minimum number of axes, or the single-axis robot.

In the preferred embodiment of the invention, the panel-side power connector 20 is separate from the panel-side signal connector 30. However, the invention is not limited in such a manner. For example, the panel-side power connector 20 and the panel-side signal connector 30 may be a common connector.

In the preferred embodiment of the invention, the front panel 8 is provided on the front side of the body housing 2. However, the invention is not limited in such a manner. A panel movable between the open first position and the closed second position may be provided on another side of the body housing 2. Alternatively, the body housing 2 may be designed such that the front side does not open at all.

In the preferred embodiment of the invention, any side of the additional controller A2 may be designed to open like the front side of the controller body A1. In this case, it is preferred that the front plate 106 be designed so that it can open. By opening the front side of the additional controller A2, the servo amplifiers 10 of the controller body A1 and the servo amplifiers 10 of the additional controller A2 can be replaced from the same direction (from the front).

In the preferred embodiment of the invention, the personal computer PC and the teaching pendant TP are connected to the controller body A1. However, the invention is not limited in such a manner. For example, in addition to the personal computer PC and the teaching pendant TP, an emergency stop switch or a programmable logic controller may be connected to the controller body A1 or the additional controller A2.

The present examples and embodiments are to be considered as illustrative and not restrictive, and the invention is not to be limited to the details given herein, but may be modified within the scope and equivalence of the appended claims.

What is claimed is:

1. A robot controller system comprising:
    a robot including a first actuator and a second actuator;
    a main controller for driving the first actuator; and
    a sub-controller for driving the second actuator;
    the main controller including:
        an actuator controller for computing a target drive amount for the first actuator to generate first control data including the target drive amount for the first actuator and for computing a target drive amount for the second actuator to generate second control data including the target drive amount for the second actuator;
        a first actuator driver for generating a first drive signal based on the first control data and providing the first actuator with the first drive signal to drive the first actuator; and
        a first input/output unit providing the sub-controller with the second control data;
    the sub-controller including:
        a second actuator driver for generating a second drive signal based on the second control data and providing the second actuator with the second drive signal to drive the second actuator; and
        a second input/output unit for providing the second actuator driver with the second control data from the first input/output unit,
        wherein the second input/output unit receives the second drive signal generated by the second actuator driver and provides the first input/output unit with the received second drive signal; and
        the main controller provides the first actuator with the first drive signal generated by the first actuator driver and provides the second actuator with the second drive signal from the first input/output unit.

2. The robot controller system according to claim 1, wherein:
    the main controller further includes a power supply device for providing the first actuator driver and the first input/output unit with a power supply signal;
    the first input/output unit provides the second input/output unit with the power supply signal from the power supply device; and
    the second input/output unit provides the second actuator driver with the power supply signal from the first input/output unit.

3. The robot controller system according to claim 1, wherein:
- the robot includes a first encoder for generating a first encoder signal relating to a drive amount of the first actuator, and a second encoder for generating a second encoder signal relating to a drive amount of the second actuator; and
- the main controller further includes a third input/output unit for receiving the first encoder signal and the second encoder signal and providing the actuator controller with the first and second encoder signals via the first and second actuator drivers respectively.

4. The robot controller system according to claim 1, wherein:
- the robot includes a first encoder for generating a first encoder signal relating to a drive amount of the first actuator, and a second encoder for generating a second encoder signal relating to a drive amount of the second actuator;
- the main controller further includes a third input/output unit for receiving the first encoder signal and providing the actuator controller with the first encoder signal via the first actuator driver; and
- the sub-controller further includes a fourth input/output unit for receiving the second encoder signal and providing the actuator controller with the second encoder signal via the second actuator driver.

5. The robot controller system according to claim 1, wherein the robot has a peripheral device including the second actuator.

* * * * *